United States Patent
Ohira

(10) Patent No.: US 10,569,266 B2
(45) Date of Patent: Feb. 25, 2020

(54) ION EXCHANGER

(71) Applicant: TOYOTA BOSHOKU KABUSHIKI KAISHA, Aichi-ken (JP)

(72) Inventor: Junko Ohira, Kariya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 211 days.

(21) Appl. No.: 15/621,598

(22) Filed: Jun. 13, 2017

(65) Prior Publication Data
US 2017/0368547 A1 Dec. 28, 2017

(30) Foreign Application Priority Data
Jun. 22, 2016 (JP) .................... 2016-123508

(51) Int. Cl.
| | | |
|---|---|---|
| *C02F 1/42* | (2006.01) | |
| *B01J 47/024* | (2017.01) | |
| *B01J 47/12* | (2017.01) | |
| *H01M 8/04044* | (2016.01) | |
| *C02F 103/02* | (2006.01) | |

(52) U.S. Cl.
CPC ............ *B01J 47/024* (2013.01); *B01J 47/12* (2013.01); *C02F 1/42* (2013.01); *H01M 8/04044* (2013.01); *C02F 2001/427* (2013.01); *C02F 2103/023* (2013.01); *C02F 2201/006* (2013.01); *C02F 2301/043* (2013.01); *C02F 2301/046* (2013.01)

(58) Field of Classification Search
CPC ................. C02F 1/42; C02F 2001/427; C02F 2103/023; C02F 2201/006; C02F 2301/043; C02F 2301/046; B01J 47/024; B01J 47/12; H01M 8/04044
See application file for complete search history.

(56) References Cited

U.S. PATENT DOCUMENTS

| | | | |
|---|---|---|---|
| 4,857,189 A * | 8/1989 | Thomsen ............... | B01D 27/08 210/232 |
| 6,533,931 B1 * | 3/2003 | Reid ....................... | B01D 35/31 210/232 |

(Continued)

FOREIGN PATENT DOCUMENTS

| | | |
|---|---|---|
| JP | 2003-511227 | 3/2003 |
| JP | 4113715 | 7/2008 |

OTHER PUBLICATIONS

Office Action in counterpart Japanese Application No. 2016-123508, dated Nov. 26, 2019 (along with English-language translation thereof).

*Primary Examiner* — Matthew O Savage
(74) *Attorney, Agent, or Firm* — Greenblum & Bernstein, P.L.C.

(57) ABSTRACT

An ion exchanger includes a housing and a cartridge. The housing has an inlet port, through which coolant flows in, and an outlet port, through which the coolant flows out. The cartridge is detachably attached to the housing. The cartridge is filled with ion-exchange resin. The ion exchanger is configured to remove ions from the coolant through ion exchange when the coolant flowing in the housing passes through the ion-exchange resin. The cartridge includes a bypass route that causes some of the coolant that has flowed into the housing to bypass the ion-exchange resin and flow to the outlet port.

6 Claims, 5 Drawing Sheets

(56) References Cited

U.S. PATENT DOCUMENTS

2013/0199986 A1* 8/2013 Miller .................... B01J 47/024
                                                        210/259
2014/0251891 A1* 9/2014 Rickenbach ........... B01D 24/10
                                                        210/282

* cited by examiner

ION EXCHANGER

BACKGROUND OF THE INVENTION

The present invention relates to an ion exchanger.

When a fuel cell is mounted on a vehicle or the like, a cooling circuit that circulates coolant for cooling the fuel cell is provided for the purpose of suppressing temperature rise of the fuel cell at the time of power generation. However, in the cooling circuit, as the concentration of ions contained in the coolant increases due to elution of ions from piping or the like, the electric conductivity of the coolant may be increased. This can degrade the function of the fuel cell. Therefore, the cooling circuit is provided with an ion exchanger for removing ions contained in the coolant (see Japanese Patent No. 4113715). The ion exchanger includes ion-exchange resin, which is formed by blending anion resin and cation resin, and removes ions contained in the coolant through ion exchange in the ion-exchange resin.

Since it is necessary to periodically replace the ion-exchange resin with a new one, the ion exchanger has a structure that allows for easy replacement of the ion-exchange resin. Specifically, the housing of the ion exchanger is provided with an inlet port, through which the coolant in the cooling circuit flows in, and an outlet port, through which the coolant that has flowed into the housing flows out to the cooling circuit. In addition, a cartridge filled with ion-exchange resin is detachably attached to the housing.

When the coolant in the cooling circuit flows into the housing through the inlet port and passes through the ion-exchange resin of the cartridge, ions contained in the coolant are removed through ion exchange in the ion-exchange resin. The coolant after ions are removed in this way flows out from the inside of the housing to the cooling circuit via the outlet port. Also, the replacement of the ion-exchange resin in the above-described ion exchanger is carried out by removing the cartridge together with the ion-exchange resin from the housing, and thereafter attaching another cartridge filled with fresh ion-exchange resin to the housing.

Further, the ion exchanger is provided with a bypass route for causing some of the coolant that has flowed into the housing via the inlet port to flow to the outlet port of the housing while bypassing the ion-exchange resin. The flow area of the coolant in the bypass route affects the flow rate of the coolant passing through the ion-exchange resin. In this respect, the flow area of the coolant in the bypass route is set such that the flow rate of the coolant passing through the ion-exchange resin becomes an optimum value. That is, the flow area of the coolant in the bypass route is determined such that the flow rate of the coolant passing through the ion-exchange resin becomes the optimum value in terms of extending the replacement cycle of the ion-exchange resin and sufficiently removing ions from the coolant.

At the shipment or maintenance of a vehicle, there is a demand for intensive removal of ions from coolant to suppress the concentration of ions contained in the coolant in the cooling circuit below a specified value. To respond to such a demand, a cartridge for intensive ion removal may be employed. Specifically, this cartridge, which is specialized for intensive removal of ions from coolant, is attached to the housing of the ion exchanger at the time of shipment or maintenance of the vehicle. In this state, the coolant is circulated in the cooling circuit.

As an intensive ion removal cartridge, a cartridge is employed that is filled with an optimum amount of ion-exchange resin to intensively remove ions from the coolant, and in which anion resin and cation resin are blended at an optimum ratio for intensively removing ions from the coolant. On the other hand, a cartridge used in normal times (a normal cartridge) is filled with ion-exchange resin the amount of which is optimum for removing ions from the coolant during normal use and that is formed by blending anion resin and cation resin at an optimum ratio for removing ions from the coolant at normal use.

After the concentration of ions in coolant is reduced to a level less than the specified value by intensively removing ions from the coolant by using the intensive ion removal cartridge, the intensive ion removal cartridge is removed from the housing, and a normal cartridge is attached to the housing and used.

However, when the above-described intensive ion removal cartridge is attached to the housing and the coolant in the cooling circuit is circulated, some of the coolant that has flowed into the housing through the inlet port flows into the bypass route in the housing. Then, the coolant that has flowed into the bypass route flows to the outlet port without flowing through the ion-exchange resin, that is, after bypassing the ion-exchange resin. As such, even when a cartridge (ion-exchange resin) specialized for intensive removal of ions from coolant is used, the amount of coolant that flows through the ion-exchange resin of the intensive ion removal cartridge cannot be increased easily. Thus, it is impossible to allow the ion-exchange resin to exert its function to a sufficient extent.

It is conceivable to set the flow area of coolant in the bypass route to be small in consideration of intensive removal of ions from the coolant. In this case, however, when a normal cartridge is used, coolant cannot flow at the optimum flow rate for ion-exchange resin.

SUMMARY OF THE INVENTION

It is an objective of the present invention to provide an ion exchanger that allows ion-exchange resin of an intensive ion removal cartridge used for intensively removing ions from coolant to exhibit its function to a sufficient extent, while allowing the coolant to flow at an adequate flow rate through an ion-exchange resin of a normal cartridge, which is used at normal times.

To achieve the foregoing objectives and in accordance with one aspect of the present invention, an ion exchanger is provided that includes a housing that includes an inlet port, into which coolant flows, and an outlet port, through which the coolant flows out, and a cartridge that is filled with ion-exchange resin and is detachably attached to the housing. The ion exchanger is configured to remove ions from the coolant through ion exchange when the coolant flowing in the housing passes through the ion-exchange resin. The cartridge includes a bypass route that causes some of the coolant that has flowed into the housing to bypass the ion-exchange resin and flow to the outlet port.

DETAILED DESCRIPTION OF THE PREFERRED EMBODIMENTS

An ion exchanger according to one embodiment will now be described with reference to FIGS. 1 to 6.

Figure 1:
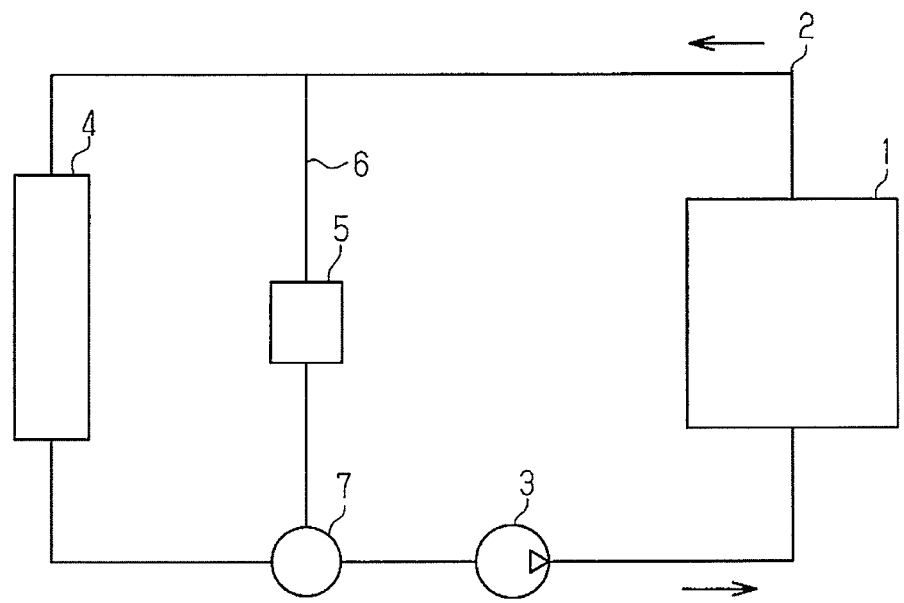
FIG. 1 is a schematic diagram showing the overall configuration of a cooling circuit provided with an ion exchanger.

As shown in FIG. 1, a vehicle equipped with a fuel cell 1 is provided with a cooling circuit 2 in which coolant flows to cool the fuel cell 1. As such coolant, coolant containing ethylene glycol (long life coolant) or the like is used. The cooling circuit 2 includes a pump 3, which is driven to circulate the coolant.

The cooling circuit 2 includes a radiator 4 in a section upstream of the pump 3. The fuel cell 1, of which the temperature rises during power generation, is cooled by the coolant circulating through the cooling circuit 2 and passing through the fuel cell 1. When heated by taking heat from the fuel cell 1, the coolant is cooled by the outside air when passing through the radiator 4 and then flows to the pump 3.

The cooling circuit 2 is provided with an ion exchanger 5 for removing ions contained in the coolant and a bypass pipe 6 for causing the coolant flow to the ion exchanger 5. The ion exchanger 5 is provided in the middle of the bypass pipe 6. A first end of the bypass pipe 6 is connected to a section of the cooling circuit 2 that is downstream of the fuel cell 1 and upstream of the radiator 4. A second end of the bypass pipe 6 is connected via a valve 7 to a section of the cooling circuit 2 that is downstream of the radiator 4 and upstream of the pump 3.

The valve 7 opens and closes in order to determine whether the coolant that has passed through the fuel cell 1 flows to the bypass pipe 6 (the ion exchanger 5). More specifically, when the valve 7 is closed, the coolant flows toward the radiator 4 without flowing to the bypass pipe 6. In contrast, when the valve 7 is opened, some of the coolant that has passed through the fuel cell 1 flows into the bypass pipe 6 instead of flowing toward the radiator 4. The coolant that has flowed into the bypass pipe 6 in this manner is deprived of ions when passing through the ion exchanger 5 and then flows to a section of the cooling circuit 2 that is downstream of the radiator 4 and upstream of the pump 3.

The structure of the ion exchanger 5 will now be described.

Figure 2:
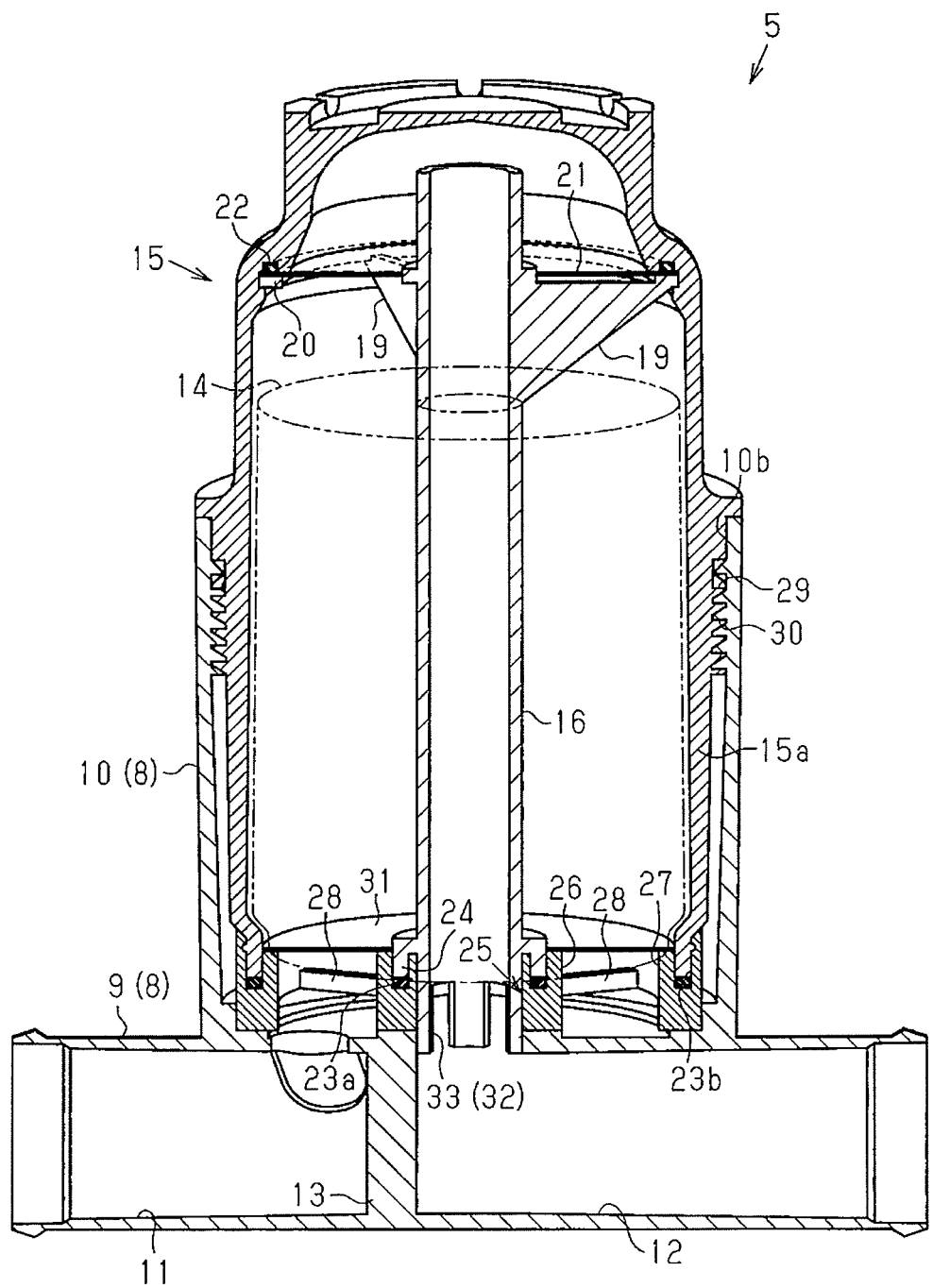
FIG. 2 is a cross-sectional view showing the structure of the ion exchanger.

As shown in FIG. 2, the ion exchanger 5 has a housing 8 connected to the bypass pipe 6 (FIG. 1). The housing 8 has an inlet port 11, into which the coolant flows from the bypass pipe 6, and an outlet port 12, through which the coolant flows out to the bypass pipe 6. Further, a cartridge 15 filled with ion-exchange resin 14 is attached to the housing 8. The cartridge 15 is detachable from the housing 8. The housing 8 includes a coolant circulating pipe 9 and a case portion 10. The coolant circulating pipe 9 has the inlet port 11 and the outlet port 12. The case portion 10 is integrated with the coolant circulating pipe 9. The cartridge 15 is detachably connected to the case portion 10. As shown in FIG. 2, in the coolant circulating pipe 9, the inlet port 11 and the outlet port 12 are formed by dividing the inner space of the coolant circulating pipe 9 by a partition wall 13.

The cartridge 15, which is connected to the case portion 10, includes a cylindrical body 15a and an outflow pipe 16. The cylindrical body 15a has a closed first end (the upper end as viewed in FIG. 2) and an open second end (the lower end as viewed in FIG. 2). The cylindrical body 15a is connected to the inlet port 11 of the housing 8 (the coolant circulating pipe 9) via the open second end. The outflow pipe 16 is held to extend in the vertical direction inside the cylindrical body 15a and is connected to the outlet port 12 of the housing 8 (the coolant circulating pipe 9). The ion-exchange resin 14 is provided between the inner wall of the cylindrical body 15a of the cartridge 15 and the outer wall of the outflow pipe 16. The ion-exchange resin 14 is formed by blending anion resin and cation resin at a predetermined ratio.

The coolant flowing through the cooling circuit 2 shown in FIG. 1, more specifically, the coolant flowing through the section of the bypass pipe 6 that is upstream of the ion exchanger 5 flows into the housing 8 through the inlet port 11 of the ion exchanger 5 shown in FIG. 2. The coolant then passes through the ion-exchange resin 14 from bottom to top. When the coolant passes through the ion-exchange resin 14 in this manner, ions contained in the coolant are removed through ion exchange in the ion-exchange resin 14. After ions are removed by the ion-exchange resin 14, the coolant flows out to the section of the bypass pipe 6 that is downstream of the ion exchanger 5 via the outflow pipe 16 of the cartridge 15 and the outlet port 12 of the housing 8.

Next, the detailed structure of the cartridge 15 will be described.

Figure 3:
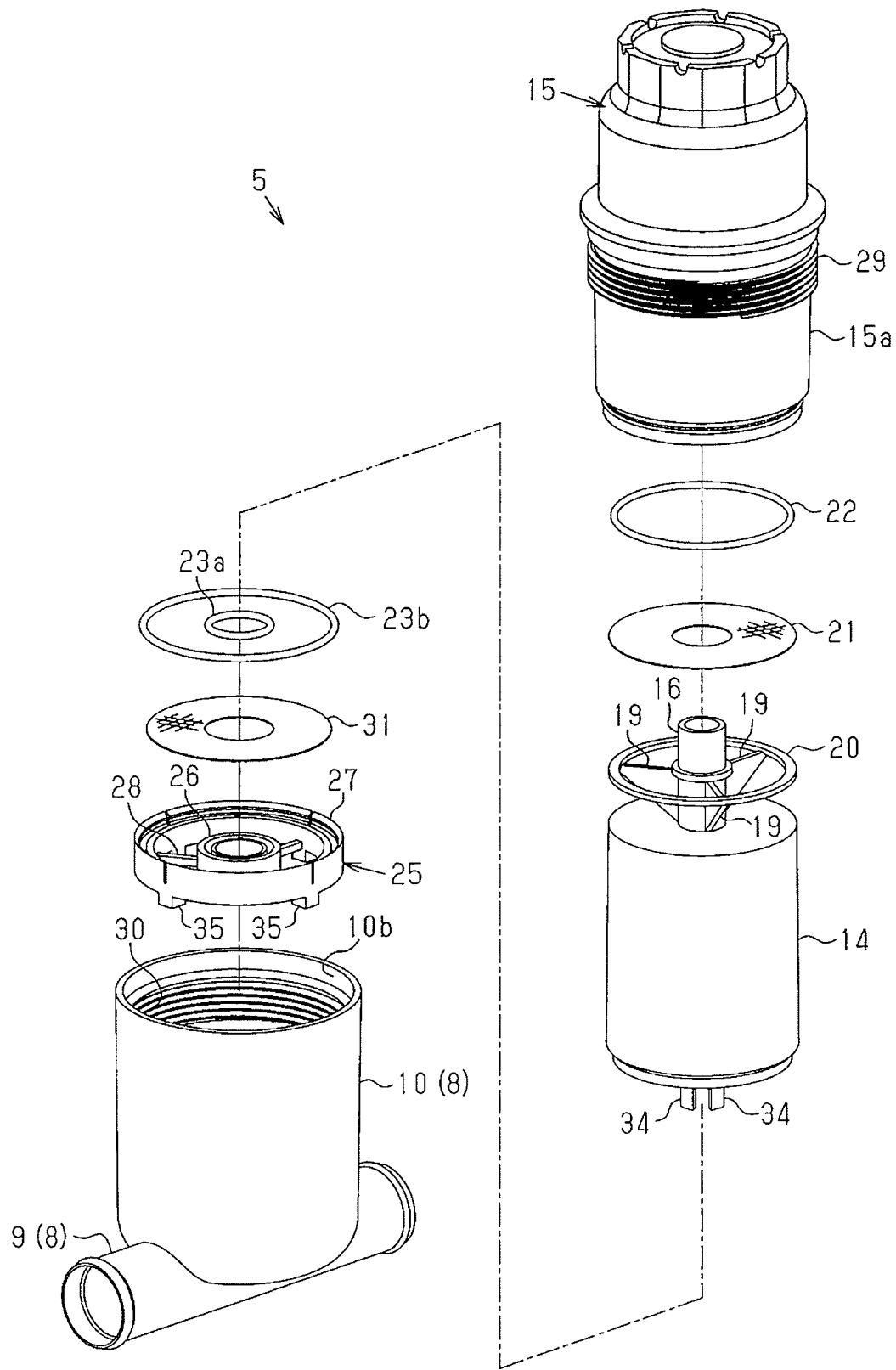
FIG. 3 is a perspective view showing a disassembled state in which the cartridge is detached from the ion exchanger.

As shown in FIGS. 2 and 3, the outflow pipe 16 extends vertically through the ion-exchange resin 14 in the cylindrical body 15a of the cartridge 15. The outflow pipe 16 has three support portions 19 on the outer circumferential wall (the outer surface) of the upper end portion. The support portions 19 are arranged at intervals in the circumferential direction. FIG. 2 shows two of the three support portions 19. A ring portion 20 having the same central axis as that of the outflow pipe 16 is integrally formed with the support portions 19 at the distal ends in the projecting direction of the support portions 19. A mesh disk 21 through which the outflow pipe 16 passes is provided on the upper surface of the ring portion 20. A seal ring 22 is provided on the upper surface of the outer peripheral portion of the mesh disk 21. The mesh disk 21 and the seal ring 22 are held between the upper surface of the ring portion 20 and the inner wall of the cylindrical body 15a of the cartridge 15 near the first end.

The lower end portion of the outflow pipe 16 protrudes downward from the lower surface of the ion-exchange resin 14 and passes through the center portion of a mesh disk 31 contacting the lower surface of the ion-exchange resin 14. As shown in FIG. 2, the outflow pipe 16 has a flange 24 on the outer circumferential surface (the outer surface) of the lower portion. The flange 24 extends annularly along the outer circumferential surface of the outflow pipe 16 and protrudes downward. Seal rings 23a, 23b contact the lower end surface (the distal end surface) of the flange 24 and the lower end surface of the cylindrical body 15a. A bottom member 25 is attached to the lower end of the flange 24 and the lower end (the second end) of the cylindrical body 15a. The bottom member 25 is configured to hold the ion-exchange resin 14 between the inner wall of the cylindrical body 15a and the outer wall of the outflow pipe 16 and cause the coolant that has flowed into the housing 8 via the inlet port 11 to pass through the ion-exchange resin 14.

Figure 6:
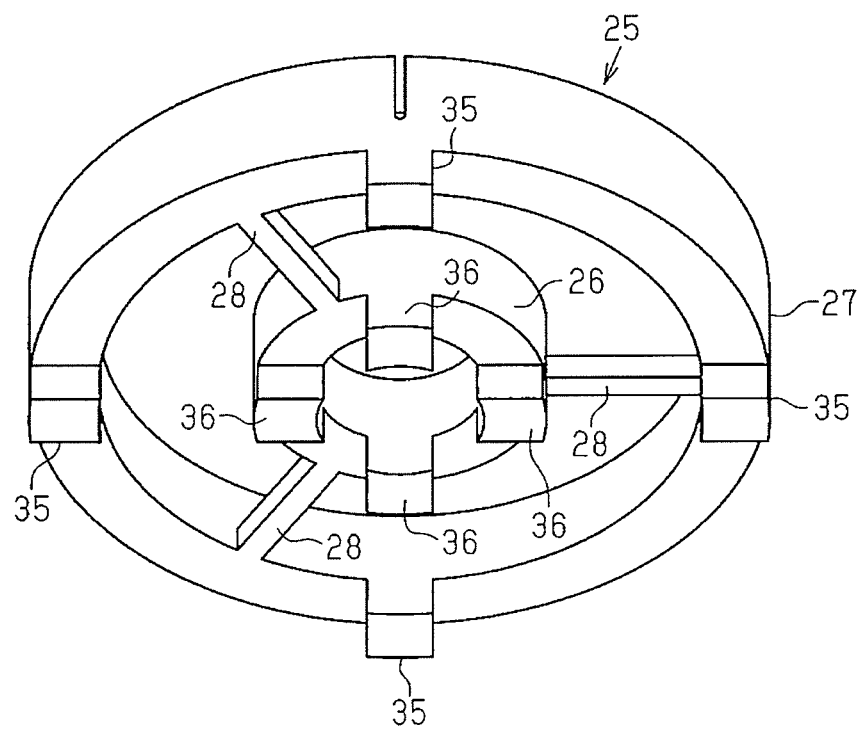
FIG. 6 is a perspective view illustrating the bottom member as viewed from below.

Specifically, the bottom member 25 includes an annular inner circumferential portion 26, an annular outer circumferential portion 27, and three connecting portions 28. The inner circumferential portion 26 is fitted into the lower end portion of the flange 24 of the outflow pipe 16. The outer circumferential portion 27 is fitted into the lower end portion of the cylindrical body 15a of the cartridge 15. The connecting portions 28 extend radially from the outflow pipe 16 between the inner circumferential portion 26 and the outer circumferential portion 27 to connect the inner circumferential portion 26 and the outer circumferential portion 27 to each other. As shown in FIG. 6, the connecting portions 28 are provided at intervals around the outer circumferential surface of the outflow pipe 16. FIG. 2 shows two of the three connecting portions 28.

By fitting the inner circumferential portion 26 and the outer circumferential portion 27 of the bottom member 25 to the lower end portion of the flange 24 and the lower end portion of the cylindrical body 15a, the seal ring 23a is arranged between the inner circumferential portion 26 and the lower end of the flange 24. Also, the seal ring 23b is held between the outer circumferential portion 27 and the lower end of the cylindrical body 15a. At this time, the mesh disk 31 is held between the ion-exchange resin 14 and the set of the inner circumferential portion 26 and the outer circumferential portion 27. By fixing the bottom member 25 to the lower end portion of the flange 24 and the lower end portion of the cylindrical body 15a in this manner, the ion-exchange resin 14 and the outflow pipe 16 are held in the cylindrical body 15a of the cartridge 15.

The cylindrical body 15a of the cartridge 15 has an external thread 29 formed on the outer circumferential surface. The case portion 10 of the housing 8 has an internal thread 30 formed on the inner circumferential surface of the case portion 10. The external thread 29 can be screwed into the internal thread 30. The cartridge 15 is attached to the case portion 10 by screwing the external thread 29 of the cylindrical body 15a into the internal thread 30 of the case portion 10. When such attachment is carried out, a portion of the case portion 10 connected to the inlet port 11 of the housing 8 communicates with a portion of the bottom member 25 between the inner circumferential portion 26 and the outer circumferential portion 27. Further, the lower end portion of the outflow pipe 16 is connected to the outlet port 12 of the housing 8.

FIG. 3 shows a state in which the cartridge 15 is removed from the case portion 10 of the housing 8 of the ion exchanger 5 and disassembled. The removal of the cartridge 15 from the case portion 10 of the housing 8 is performed by turning the cylindrical body 15a (the cartridge 15) in a loosening direction, which is the direction opposite to the turning direction when the external thread 29 of the cylindrical body 15a is screwed into the internal thread 30 of the case portion 10. In the ion exchanger 5, the cartridge 15 is replaced together with the ion-exchange resin 14 periodically.

As shown in FIG. 2, the ion exchanger 5 has a bypass route 32, which causes some of the coolant that has flowed into the housing 8 via the inlet port 11 to bypass the ion-exchange resin 14 and flow to the outlet port 12 of the housing 8. The flow area of the coolant in the bypass route 32 affects the flow rate of the coolant passing through the ion-exchange resin 14. For this reason, the flow area of the coolant in the bypass route 32 is set in the following manner to optimize the value of the flow rate of the coolant passing through the ion-exchange resin 14. That is, the flow area of the coolant in the bypass route 32 is set such that the flow rate of the coolant passing through the ion-exchange resin 14 becomes the optimum value in terms of extending the replacement cycle of the ion-exchange resin 14 and sufficiently removing ions from the coolant.

The bypass route 32 of the ion exchanger 5 will now be described.

Figure 4:
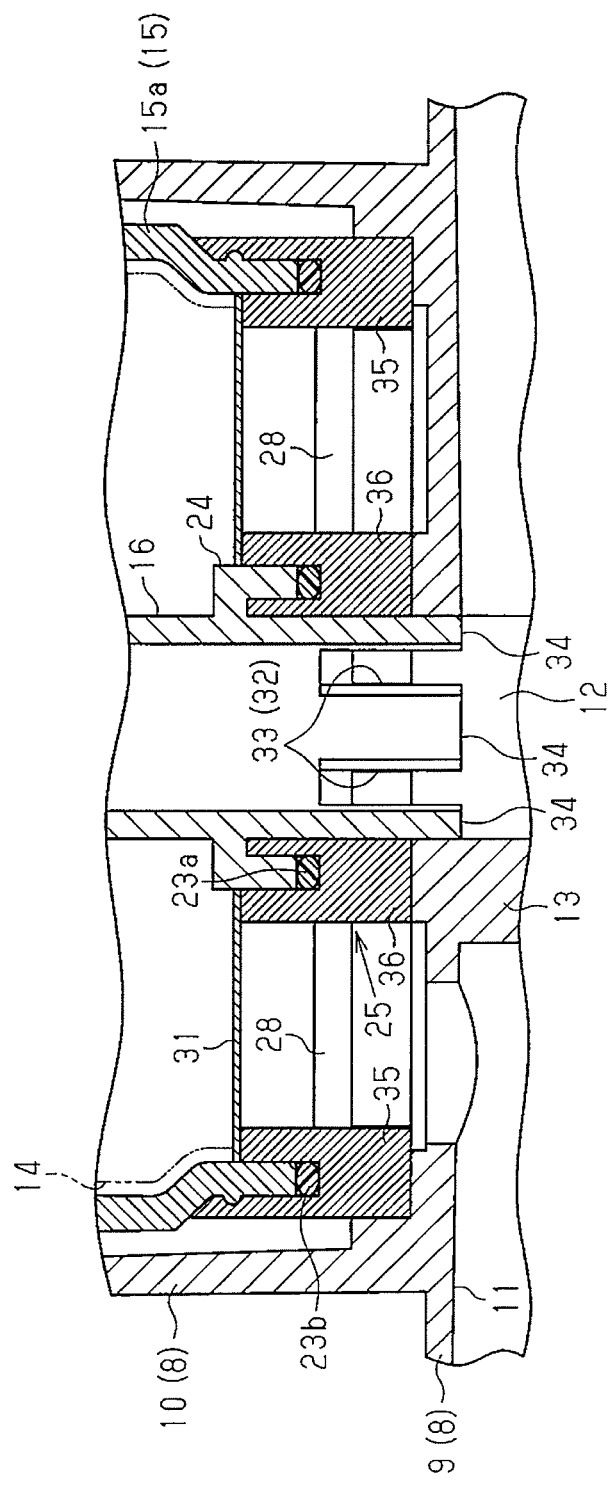
FIG. 4 is a cross-sectional view showing the case portion of the housing and the lower end portion of the cartridge.

FIG. 4 is an enlarged view around the lower end portion of the case portion 10 of the housing 8 and the lower end portion of the cartridge 15 attached to the case portion 10. The bypass route 32 is provided between the outflow pipe 16 and a portion of the cylindrical body 15a connected to the inlet port 11 of the housing 8. The bypass route 32 includes communication passages 33, which are formed on the outer wall of the lower end portion of the outflow pipe 16 to connect the inside and the outside of the outflow pipe 16.

Figure 5:
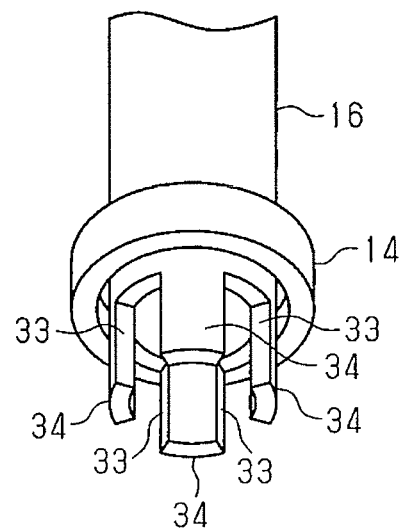
FIG. 5 is a perspective view showing the lower end portion of the outflow pipe.

As shown in FIG. 5, the outflow pipe 16 has a total of four insertion portions 34 arranged at equal intervals in the circumferential direction of the outflow pipe 16 at the lower end portion. As shown in FIG. 4, when the cartridge 15 is attached to the case portion 10 of the housing 8, the insertion portions 34 of the outflow pipe 16 pass through the inner circumferential portion 26 of the bottom member 25, and the lower ends of the insertion portions 34 are inserted into the portion of the housing 8 corresponding to the outlet port 12 of the coolant circulating pipe 9. In this state, the gap between each pair of the insertion portions 34 adjacent to each other in the circumferential direction of the outflow pipe 16 constitutes one of the communication passages 33.

FIG. 6 illustrates the bottom member 25 of FIG. 4 as viewed obliquely from below. As shown in FIG. 6, the outer circumferential portion 27 of the bottom member 25 has four leg portions 35, which are arranged at equal intervals in the circumferential direction of the outer circumferential portion 27. The leg portions 35 protrude toward the coolant circulating pipe 9 of the housing 8 (toward the lower side in FIG. 6) and contact the coolant circulating pipe 9 (FIG. 4).

The inner circumferential portion 26 is a portion of the bottom member 25 through which the outflow pipe 16 passes. As shown in FIG. 6, the inner circumferential portion 26 has four leg portions 36 arranged at equal intervals in a direction surrounding the outflow pipe 16 (the circumferential direction of the inner circumferential portion 26). The leg portions 36 protrude toward the coolant circulating pipe 9 and contact the coolant circulating pipe 9 (FIG. 4). The gap between each pair of the leg portions 36 adjacent to each other in the circumferential direction of the inner circumferential portion 26 is connected to one of the communication passages 33 (FIG. 4) of the outflow pipe 16, and constitutes part of the bypass route 32 like the communication passages 33.

That is, the flow area of the coolant in the bypass route 32 can be adjusted by adjusting the size of the gaps between the leg portions 36 adjacent in the circumferential direction of the inner circumferential portion 26, and adjusting the size of the gaps (the communication passages 33) between the insertion portions 34 adjacent in the circumferential direction of the outflow pipe 16.

The operation of the ion exchanger 5 will now be described.

In the ion exchanger 5, the cartridge 15 (normal cartridge), which is used at normal times, has the above-described bypass route 32. The flow area of the coolant in the bypass route 32 is set in the following manner. That is, the flow area of the coolant in the bypass route 32 is set such that the flow rate of the coolant passing through the ion-exchange resin 14 becomes the optimum value in terms of extending the replacement cycle of the ion-exchange resin 14 and sufficiently removing ions from the coolant. By setting the flow area of the coolant in the bypass route 32 in this way, it is possible to cause coolant to flow at an adequate flow rate to the ion-exchange resin 14 of the cartridge 15.

On the other hand, when intensively removing ions contained in the coolant in the cooling circuit 2 at the shipment or maintenance of the vehicle, a cartridge that is specialized for intensive removal of ions from coolant is attached to the case portion 10 of the housing 8, instead of the above-described cartridge 15 (the normal cartridge). Unlike the cartridge 15, the intensive ion removal cartridge does not have the bypass route 32. The intensive ion removal cartridge has ion-exchange resin that is specialized for intensively removing ions from coolant. As the ion-exchange resin specialized for intensive removal of ions from coolant, an ion-exchange resin is employed the quantity of which is optimal for intensively removing ions from coolant, and that is formed by blending anion resin and cation resin at an optimum ratio for intensively removing ions from coolant.

Then, with the intensive ion removal cartridge attached to the ion exchanger 5, the valve 7 of the cooling circuit 2 is opened to cause coolant to flow into the bypass pipe 6, so that all the coolant that has flowed into the housing 8 through the inlet port 11 is allowed to flow to the ion-exchange resin of the intensive ion removal cartridge. This increases the flow rate of the coolant passing through the ion-exchange resin in the intensive ion removal cartridge, thereby allowing the ion-exchange resin to exert the function of intensively removing ions from the coolant to a sufficient extent.

After the concentration of ions in the coolant is reduced to a level less than a specified value by intensively removing ions from the coolant by using the intensive ion removal cartridge, the intensive ion removal cartridge is removed from the case portion 10 of the housing 8, and the above-described cartridge 15 (the normal cartridge) is attached to the case portion 10 and used.

The present embodiment as described above has the following advantage.

The ion-exchange resin of the intensive ion removal cartridge used for intensively removing ions from coolant is allowed to exhibit its function to a sufficient extent, while coolant is allowed to flow at an adequate flow rate through the ion-exchange resin 14 of the cartridge 15 (the normal cartridge), which is used at normal times.

The invention claimed is:

1. An ion exchanger comprising:
a housing that includes an inlet port, into which coolant flows, and an outlet port, through which the coolant flows out;
a cartridge that is filled with ion-exchange resin and is detachably attached to the housing, wherein the ion exchanger is configured to remove ions from the coolant through ion exchange when the coolant flowing in the housing passes through the ion-exchange resin, wherein one end of the cartridge is configured to contact the housing and to receive coolant from the inlet port and to discharge coolant to the outlet port;
wherein the cartridge includes a bypass route that causes a portion of the coolant that has flowed into the housing to completely bypass the ion-exchange resin and flow to the outlet port without the portion of the coolant passing through any ion exchange resin in the housing, and wherein the bypass route is defined by portions located on said one end of the cartridge that detachably contact portions in the housing proximate the outlet port.

2. The ion exchanger according to claim 1, wherein the cartridge includes
a cylindrical body that has a closed first end and an open second end and is connected to the inlet port of the housing via the open second end, and
an outflow pipe that is provided in the cylindrical body and is connected to the outlet port of the housing, the ion-exchange resin fills a space between an inner wall of the cylindrical body and an outer wall of the outflow pipe, and
the bypass route is provided between the outflow pipe and a portion of the cylindrical body that is connected to the inlet port of the housing.

3. The ion exchanger according to claim 2, wherein the housing includes
a coolant circulating pipe that includes the inlet port and the outlet port, wherein the inlet port and the outlet port are formed by dividing an inner space of the coolant circulating pipe by a partition wall, and
a case portion that is provided integrally with the coolant circulating pipe and is connected to the inlet port and the outlet port, wherein the cartridge is detachably attached to the case portion, and
the cartridge is configured such that, when the cartridge is attached to the case portion, the second end of the cylindrical body is connected to the inlet port and the outflow pipe is connected to the outlet port.

4. The ion exchanger according to claim 3, wherein the bypass route includes a communication passage that is formed in the outer wall of the outflow pipe to connect an inside and an outside of the outflow pipe.

5. The ion exchanger according to claim 4, wherein the outflow pipe includes a flange that protrudes from the outer wall of the outflow pipe,
the ion exchanger further comprises a bottom member that is attached to the second end of the cylindrical body and the flange, wherein one end portion of the outflow pipe that is connected to the outlet port passes through the bottom member,
the bottom member is configured to hold the ion-exchange resin, which is located between the inner wall of the cylindrical body and the outer wall of the outflow pipe, and cause the coolant that has flowed into the housing through the inlet port to pass through the ion-exchange resin,
the bottom member includes a plurality of leg portions that are located at a position in the bottom member through which the outflow pipe passes,
the leg portions are arranged at intervals in a direction surrounding a circumference of the outflow pipe,
the leg portions project toward the coolant circulating pipe of the housing and contact the coolant circulating pipe, and
a gap between each pair of the leg portions adjacent to each other in the direction surrounding the circumference of the outflow pipe is connected to the communication passage of the outflow pipe and constitutes part of the bypass route.

6. An ion exchanger comprising:
a housing that includes an inlet port, into which coolant flows, and an outlet port, through which the coolant flows out; and
a cartridge that is filled with ion-exchange resin and is threadedly attached to the housing, wherein
the ion exchanger is configured to remove ions from the coolant through ion exchange when the coolant flowing in the housing passes through the ion-exchange resin, and
the cartridge includes a bypass route that causes some of the coolant that has flowed into the housing to bypass the ion-exchange resin and flow to the outlet port, wherein the cartridge includes:
a cylindrical body that has a closed first end and an open second end and is connected to the inlet port of the housing via the open second end, and
an outflow pipe that is provided in the cylindrical body and is connected to the outlet port of the housing,
the ion-exchange resin fills a space between an inner wall of the cylindrical body and an outer wall of the outflow pipe, and
the bypass route is provided between the outflow pipe and a portion of the cylindrical body that is connected to the inlet port of the housing,
wherein the housing includes:
a coolant circulating pipe that includes the inlet port and the outlet port, wherein
the inlet port and the outlet port are formed by dividing an inner space of the coolant circulating pipe by a partition wall, and
a case portion that is provided integrally with the coolant circulating pipe and is connected to the inlet port and the outlet port, wherein the cartridge is detachably attached to the case portion, and
the cartridge is configured such that, when the cartridge is attached to the case portion, the second end of the cylindrical body is connected to the inlet port and the outflow pipe is connected to the outlet port,
wherein the bypass route includes a communication passage that is formed in the outer wall of the outflow pipe to connect an inside and an outside of the outflow pipe,
wherein the outflow pipe includes a flange that protrudes from the outer wall of the outflow pipe,
the ion exchanger further comprises a bottom member that is attached to the second end of the cylindrical body and the flange, wherein one end portion of the outflow pipe that is connected to the outlet port passes through the bottom member,
the bottom member is configured to hold the ion-exchange resin, which is located between the inner wall of the cylindrical body and the outer wall of the outflow pipe, and cause the coolant that has flowed into the housing through the inlet port to pass through the ion-exchange resin,
the bottom member includes a plurality of leg portions that are located at a position in the bottom member through which the outflow pipe passes,
the leg portions are arranged at intervals in a direction surrounding a circumference of the outflow pipe,
the leg portions project toward the coolant circulating pipe of the housing and contact the coolant circulating pipe, and
a gap between each pair of the leg portions adjacent to each other in the direction surrounding the circumference of the outflow pipe is connected to the communication passage of the outflow pipe and constitutes part of the bypass route.

\* \* \* \* \*